(12) United States Patent
Nguyen et al.

(10) Patent No.: US 11,066,498 B2
(45) Date of Patent: **\*Jul. 20, 2021**

(54) COPOLYMER HAVING LOW CYCLIC OLIGOMER CONTENT

(71) Applicant: ARLANXEO Singapore Pte. Ltd., Singapore (SG)

(72) Inventors: Paul Nguyen, London (CA); Jessica Watson, London (CA); Gilles Arsenault, London (CA)

(73) Assignee: ARLANXEO SINGAPORE PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/307,111

(22) PCT Filed: Apr. 28, 2015

(86) PCT No.: PCT/CA2015/050354
§ 371 (c)(1),
(2) Date: Oct. 27, 2016

(87) PCT Pub. No.: WO2015/164965
PCT Pub. Date: Nov. 5, 2015

(65) Prior Publication Data
US 2017/0044284 A1   Feb. 16, 2017

(30) Foreign Application Priority Data

Apr. 30, 2014  (EP) .................................. 14166580
Jun. 30, 2014  (EP) .................................. 14174869

(51) Int. Cl.
*C08F 210/12*   (2006.01)
(52) U.S. Cl.
CPC ................................ *C08F 210/12* (2013.01)

(58) Field of Classification Search
CPC ...................................................... C08F 210/12
See application file for complete search history.

(56) References Cited

U.S. PATENT DOCUMENTS 2,356,128 A   8/1944  Thomas et al.
5,417,930 A   5/1995  McDonald, Jr. et al.
(Continued)

FOREIGN PATENT DOCUMENTS

CA   2787122 A1   7/2011
CN   1729215 A    2/2006
(Continued)

OTHER PUBLICATIONS

Toxikon (C13H24and C21H40 Rubber Oligomers, Toxikon, 2012, 2 pages).*

(Continued)

*Primary Examiner* — Brieann R Johnston
(74) *Attorney, Agent, or Firm* — The Dobrusin Law Firm, P.C.

(57) ABSTRACT

A copolymer has low levels of cyclic oligomeric compounds, which are undesirable impurities in certain applications. The cyclic oligomeric compounds are provided in an advantageously low ratio of C21/C13 oligomers. The C13 oligomers are extractable using steam to further reduce the total amount of cyclic oligomers. A process for producing the copolymer having low levels of cyclic oligomers involves contacting at least one isoolefin monomer with at least one multiolefin and/or β-pinene monomer in the presence of at least one Lewis acid and at least one initiator in a diluent. The diluent contains a hydrofluorinated olefin (HFO) comprising at least three carbon atoms and at least three fluorine atoms. Hydrofluorinated olefins used in the present invention are better diluents for butyl slurry cationic polymerization than saturated hydrofluorocarbons.

9 Claims, 3 Drawing Sheets

(56) References Cited

U.S. PATENT DOCUMENTS

| | | | |
|---|---|---|---|
| 7,214,750 B2 | 5/2007 | McDonald et al. | |
| 7,232,872 B2 * | 6/2007 | Shaffer | C08F 2/06 |
| | | | 526/135 |
| 7,332,554 B2 | 2/2008 | Shaffer et al. | |
| 7,342,079 B2 | 3/2008 | Sher et al. | |
| 7,402,636 B1 | 7/2008 | Shaffer et al. | |
| 7,414,101 B2 | 8/2008 | Shaffer et al. | |
| 7,423,100 B2 | 9/2008 | McDonald et al. | |
| 7,425,601 B2 | 9/2008 | Chung et al. | |
| 7,557,170 B2 | 7/2009 | Shaffer et al. | |
| 7,582,715 B2 | 9/2009 | Milner et al. | |
| 7,699,962 B2 | 4/2010 | McDonald et al. | |
| 7,723,447 B2 | 5/2010 | Milner et al. | |
| 7,781,547 B2 | 8/2010 | Chen et al. | |
| 8,668,791 B2 | 3/2014 | Leck et al. | |
| 9,527,988 B2 | 12/2016 | Habimana et al. | |
| 9,714,304 B2 * | 7/2017 | Nguyen | C08F 210/12 |
| 2003/0216264 A1 | 11/2003 | Bartley et al. | |
| 2007/0117939 A1 | 5/2007 | Iaccino et al. | |
| 2007/0299161 A1 | 12/2007 | McDonald et al. | |
| 2007/0299190 A1 | 12/2007 | McDonald et al. | |
| 2008/0234447 A1 | 9/2008 | Shaffer et al. | |
| 2008/0262180 A1 | 10/2008 | McDonald et al. | |
| 2008/0290049 A1 | 11/2008 | Shaffer et al. | |
| 2011/0005723 A1 | 1/2011 | Mouli | |
| 2014/0128561 A1 * | 5/2014 | Thomas | C08F 214/265 |
| | | | 526/255 |

FOREIGN PATENT DOCUMENTS

| | | |
|---|---|---|
| CN | 101437870 A | 5/2009 |
| RU | 2344145 C2 | 1/2009 |
| RU | 2362786 C2 | 7/2009 |

OTHER PUBLICATIONS

Jahnke (Contamination of Injectable Powders by Volatile Hydrocarbons from Rubber Stoppers. Acta Pharm. Technol. 36(3), 1990, pp. 139-148).*

Human translation of Jahnke (Contamination of Injectable Powders by Volatile Hydrocarbons from Rubber Stoppers. Acta Pharm. Technol. 36(3), 1990, pp. 139-148), 32 pages.*

Ullmanns Encyclopedia of Industrial Chemistry, vol. A23, VCH Verlag, 1993, pp. 288-295.

Quirk, Roderic P. et al., "Polymerization: Elastomer Synthesis", Science and Technology of Rubber, Third Edition, Chapter 2, 2005, Elsevier Inc., pp. 29-104.

Supplementary European Search Report from European Application No. 15785735, dated Dec. 12, 2017, one page.

European Search Report from European Application No. 14166580, dated Feb. 24, 2015, two pages.

* cited by examiner

COPOLYMER HAVING LOW CYCLIC OLIGOMER CONTENT

FIELD OF THE INVENTION

This application relates to copolymers of an isoolefin and a multiolefin and to processes for production thereof comprising a hydrofluorinated olefin (HFO) diluent.

BACKGROUND OF THE INVENTION

Butyl rubber (IIR), a random copolymer of isobutylene and isoprene is well known for its excellent thermal stability, ozone resistance and desirable dampening characteristics. IIR is prepared commercially in a slurry process using methyl chloride as a diluent and a Friedel-Crafts catalyst as the polymerization initiator. The methyl chloride offers the advantage that $AlCl_3$, a relatively inexpensive Friedel-Crafts catalyst, is soluble in it, as are the isobutylene and isoprene comonomers. Additionally, the butyl rubber polymer is insoluble in the methyl chloride and precipitates out of solution as fine particles. The polymerization is generally carried out at temperatures of about −90° C. to −100° C. (see U.S. Pat. No. 2,356,128 and Ullmanns Encyclopedia of Industrial Chemistry, volume A 23, 1993, pages 288-295, the entire contents of each of which are herein incorporated by reference). The low polymerization temperatures are required in order to achieve molecular weights which are sufficiently high for rubber applications.

Recently there has been an emphasis on finding alternative diluents to the traditional chlorinated hydrocarbon, methyl chloride. Hydrofluorocarbons (HFC's) have similar properties to chlorinated hydrocarbons and are known refrigerants (see WO 2008/027518 and WO 2009/042847). Such HFC's, especially saturated HFC's, for example HFC-134a (1,1,1,2-tetrafluoroethane), have been identified as potential replacements for methyl chloride in polymerization processes involving higher temperatures (see U.S. Pat. No. 7,723,447, U.S. Pat. No. 7,582,715, U.S. Pat. No. 7,425,601, U.S. Pat. No. 7,423,100, U.S. Pat. No. 7,332,554, U.S. Pat. No. 7,232,872, U.S. Pat. No. 7,214,750, U.S. Pat. No. 7,699,962, US 2008/0290049, U.S. Pat. No. 7,781,547, U.S. Pat. No. 7,342,079, US 2007/0117939, US 2007/0299190, US 2007/0299161, US 2008/0234447, US 2008/0262180, U.S. Pat. No. 7,414,101, U.S. Pat. No. 7,402,636 and U.S. Pat. No. 7,557,170).

However, such saturated HFC's are strong greenhouse gases and their use is undesirable. The most studied HFC is HFC-134a (1,1,1,2-tetrafluroethane), also known as R134a, which has been broadly commercialized as a refrigerant in the 1990's to replace chlorofluorocarbons (CFC's) and hydrochlorofluorocarbons (HCFC's), which are ozone-depleting chemicals. The expanding use of HFC-134a is now posing a significant environmental threat as such HFC's are known to be powerful greenhouse gases. The GWP (Global-Warming Potential) of HFC-134a is 1430. There have been several discussions internationally to implement a controlled program to phase out of HFC-134a.

Further, cyclic oligomers are formed in significant quantities in butyl polymerization using either HFC-134a or methyl chloride as diluents or their blends thereof. These impurities are undesirable for pharmaceutical applications, such as rubber closures, due to the potential to extract the oligomers from the rubber. Furthermore, isoprenoid (short chain branching) structures are formed in significant quantities in butyl polymerization using methyl chloride as diluent. Isoprenoid structures limit the efficiency of subsequent halogenation reactions when producing halobutyl rubbers. Furthermore, when high isoprene butyl rubber is desired, traditional reactions require careful control of process conditions to increase isoprene levels in the butyl rubber.

Thus, there is still a need for polymerization vehicles that are relatively inexpensive, are not strong contributors to the greenhouse effect and/or provide improvement to the polymerization process. There is also still a need for butyl polymers having low levels of cyclic oligomers, low levels of isoprenoid structures and/or high levels of isoprene.

SUMMARY OF THE INVENTION

It has now been surprisingly found that a particular class of HFC's, the hydrofluorinated olefins (HFO's), and in particular the class of HFO's known as tetrafluorinated propenes, are an excellent medium for butyl rubber slurry polymerization processes. There is provided a process for producing a copolymer, comprising: contacting at least one isoolefin monomer with at least one multiolefin and/or p-pinene monomer in the presence of at least one Lewis acid and at least one initiator in a diluent comprising a tetraflourinated propene. There is further provided a copolymer produced by a process of the present invention.

It has also been surprisingly found that blends of HFO's and other inert solvents in butyl rubber slurry polymerization processes result in polymers having low levels of isoprenoid (short chain branching) structures. There is provided a process for producing a copolymer, comprising: contacting at least one isoolefin monomer with at least one multiolefin and/or p-pinene monomer in the presence of at least one Lewis acid and at least one initiator in a diluent comprising a blend of a tetraflourinated propene and an inert solvent other than the tetraflourinated propene.

When certain HFO's are used as diluents, these processes advantageously result in polymers having high levels of multiolefin incorporated therein. There is provided a copolymer of at least one isoolefin monomer and at least one multiolefin and/or p-pinene monomer having a multiolefin and/or β-pinene monomer content higher than a comparable polymer produced in a butyl rubber slurry process using 1,1,1,2-tetrafluoroethane as a diluent.

When certain HFO's are used as diluents, these processes advantageously result in polymers having low levels of cyclic oligomers and/or polymers having advantageously low ratios of C21/C13 oligomers. There is provided a copolymer of at least one isoolefin monomer and at least one multiolefin and/or β-pinene monomer having a cyclic oligomer content at least 10% lower than a comparable polymer produced in a butyl rubber slurry process using 1,1,1,2-tetrafluoroethane as a diluent.

When certain HFO's are used as diluents, these processes advantageously result in polymers having low levels of isoprenoid (short chain branching) structures. There is also provided a copolymer of at least one isoolefin monomer and at least one multiolefin and/or β-pinene monomer having an isoprenoid content lower than a comparable polymer produced in a butyl rubber slurry process using 1,1,1,2-tetrafluoroethane as a diluent.

A copolymer may be produced according to a process comprising: contacting at least one isoolefin monomer with at least one multiolefin and/or β-pinene monomer in the presence of at least one Lewis acid and at least one initiator in a diluent. A copolymer may be produced at a temperature of less than or equal to −75° C. or less than or equal to −95° C. The diluent preferably comprises a hydrofluorinated olefin (HFO) comprising at least three carbon atoms and at least three fluorine atoms. The diluent may comprise at least three carbon atoms and/or at least four fluorine atoms. A preferred diluent comprises four fluorine atoms. A particularly preferred diluent is of the class known as tetrafluorinated propenes, comprising three carbon atoms and four fluorine atoms.

Hydrofluorinated olefins comprising tetraflourinated propenes are better diluents for butyl slurry cationic polymerization than saturated hydrofluorocarbons. For example HFO-1234yf (2,3,3,3-tetrafluoro-1-propene) was found to be surprisingly a much better diluent for butyl slurry cationic polymerization than HFC-134a (1,1,1,2-tetrafluoroethane), especially at low temperature (e.g. −95° C.), but also at elevated temperature (e.g. −75° C.). Use of tetraflourinated propenes (e.g. HFO-1234yf) as a diluent provides one or more of the following advantages: higher polymer yield; higher multiolefin incorporation; higher molecular weight polymer chains; narrower molecular weight distribution; lower cyclic oligomer by-products; a more favourable ratio of C21/C13 cyclic oligomers; and/or a lower isoprenoid (short chain branching) structure content.

Copolymers may contain significantly lower isoprenoid content than butyl rubber produced in 1,1,1,2-tetrafluoroethane, indicating decreased short chain branching resulting from polymer back-biting reactions during the polymerization. A butyl rubber with a lower isoprenoid content will have a higher proportion of total unsaturations available in a 1,4-unit orientation for further chemical modification, and is expected to have higher efficiency in subsequent halogenation reactions in order to produce halobutyl rubber. The isoprenoid content may be less than about 15% based on the total unsaturations present in the polymer, preferably less than about 12%, more preferably about 11% or less, even more preferably about 6% or less. Total unsaturations is defined as the sum of multiolefin (mol %) and isoprenoid (mol %), where mol % is based on total moles of monomer units in the copolymer. Isoprenoid content is defined as a ratio of isoprenoid (mol %) to total unsaturations (mol %).

The copolymer may have a cyclic oligomer content at least 10% lower than a comparable polymer produced in a butyl rubber slurry process using 1,1,1,2-tetrafluoroethane as a diluent. The cyclic oligomer content may be at least 25% lower, at least 50% lower, at least 60% lower, at least 70% lower, or at least 75% lower than a comparable polymer produced in a butyl rubber slurry process using 1,1,1,2-tetrafluoroethane as a diluent. The ratio of C21/C13 oligomers in the copolymer may be less than or equal to 2.5, 2.0 or 1.5. Total cyclic oligomer content may be less than 3200 ppm with a ratio of C21/C13 oligomers of less than 1.5. These copolymers may have a cyclic oligomer content of less than or equal to 2000 ppm, less than or equal to 1000ppm, less than or equal to 700 ppm, or less than or equal to 650 ppm.

The copolymer may be dissolved in a solvent suitable for extracting C13 cyclic oligomeric products. The solvent may be removed to strip the solvent and the C13 cyclic oligomeric products from the copolymer. The solvent may be non-polar and may comprise an alkane, such as hexane. The stripping may be conducted at elevated temperature using, for example, steam as a stripping agent. The polymer may be previously dissolved in an alcohol, such as ethanol, prior to the stripping step. The ratio of C21/C13 oligomers in the polymer prior to stripping may be less than or equal to 7.9, 7.3, 2.5, 1.5 or 1.0.

Formation of cyclic oligomers may be drastically suppressed in the presence of hydrofluorinated olefins as the diluent, especially at a temperature of −90° C. or lower (e.g. −95° C.). The oligomeric content of polymers of the present invention may be at least 20% lower, at least 30% lower, at least 40% lower, at least 50% lower, at least 55% lower, at least 60% lower, at least 65% lower, at least 70% lower, at least 75% lower, at least 80% lower, at least 85% lower, at least 90% lower and/or up to 95% lower than with other diluents, e.g. HFC-134a and/or methyl chloride.

Multiolefin (e.g. isoprene) content of polymers of the present invention may be in a range of from 0.5 to 15 mol %, based on the weight of the polymer. Multiolefin content of polymers may be up to 5-10% greater than polymers produced using prior art diluents (e.g. MeCl and/or HFC-134a) at similar temperature and conversion. Higher multiolefin content is especially evident when comparing the use of HFO-1234yf to HFC-134a, especially at a temperature of −75° C. or lower (e.g. −95° C.). Higher incorporation of multiolefin equates to better utilization of the multiolefin, meaning less waste and lower overall process cost. Incorporation of multiolefin may be compared based on a ratio of feed monomer composition ($f=[M_1]/[M_2]$) to copolymer composition ($F=[M_1]/[M_2]$). The ratio of feed monomer composition to copolymer composition (f/F) in a process of the present invention is preferably greater than about 0.7, more preferably greater than about 0.8, even more preferably about 0.85 or greater, yet even more preferably about 0.9 or greater.

The molecular weights of polymers of the present invention are similar to or significantly higher than the molecular weights of polymers produced using prior art diluents (e.g. MeCl and/or HFC-134a). At higher temperatures, e.g. around −75° C., the molecular weights are greater, but a temperature of −90° C. or lower (e.g. −95° C.), the molecular weights of the present polymers, especially those produced in HFO-1234yf, can be significantly greater than that of polymers produced in prior art diluents (e.g. MeCl and/or HFC-134a). For example, at −75° C., the weight average molecular weight (Mw) may be greater than or equal to 330,000 g/mol or greater than or equal to 400 g/mol, and at −95° C. the molecular weight may be greater than or equal to 445,000 g/mol or greater than or equal to 475,000 g/mol. This means that it is possible to produce a desired molecular weight co-polymer at a higher temperature with tetraflourinated propene diluents, which leads to reduced energy cost, improved process economics and reduced impact on the environment.

Yield of the polymer produced in the present process may be at least comparable to, and in some cases may be over 1.5 times, or even over 2 times, the yield obtained using prior art diluents (e.g. MeCl and/or HFC-134a). Higher yields are especially evident when comparing the use of HFO-1234yf to HFC-134a, especially at a temperature of −90° C. or lower (e.g. −95° C.).

Therefore, for a given molecular weight, production at higher temperature is possible using the tetraflourinated propene diluents of the present invention, at higher conversion and more efficient isoprene utilization than can be obtained using prior art diluents (e.g. MeCl and/or HFC-134a). This surprising combination of advantageous features leads to lower overall process costs and improved polymers.

Furthermore, certain HFO's have desirable properties but do not harm ozone (Ozone Depleting Potential, ODP=0) and have little or no potential for global warming. Examples of these more eco-friendly hydrofluorinated olefins are the tetraflourinated propenes HFO-1234fy (GWP=4) and HFO-1234ze (GWP=6), which are especially noteworthy as potential replacements for HFC-134a (GWP=1430).

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Figure 1A:
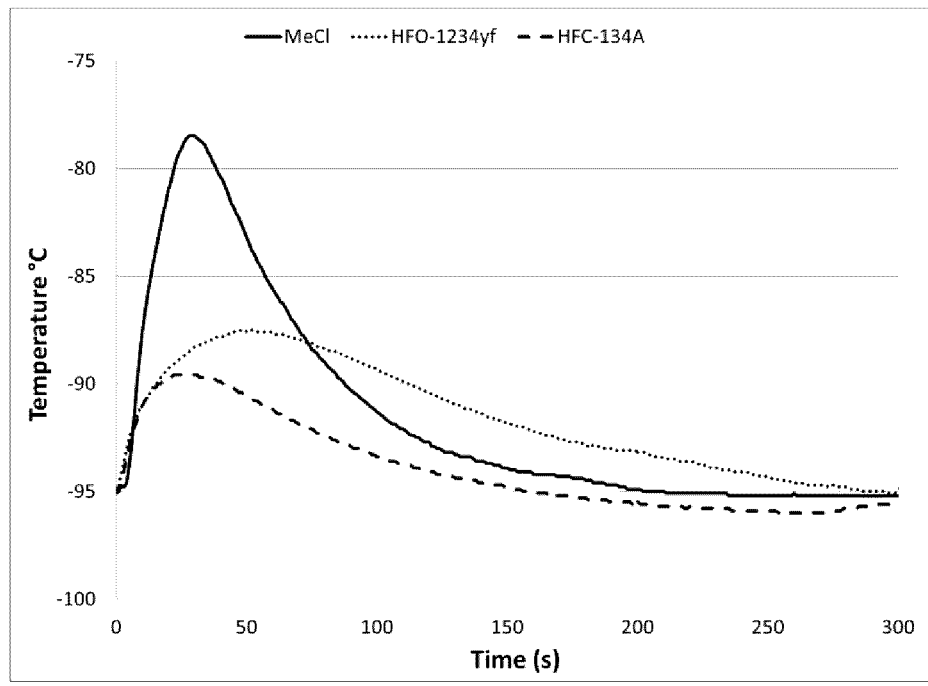
FIG. 1A depicts reaction temperature profile for reactions with pure diluent components at −95° C.
Figure 1B:
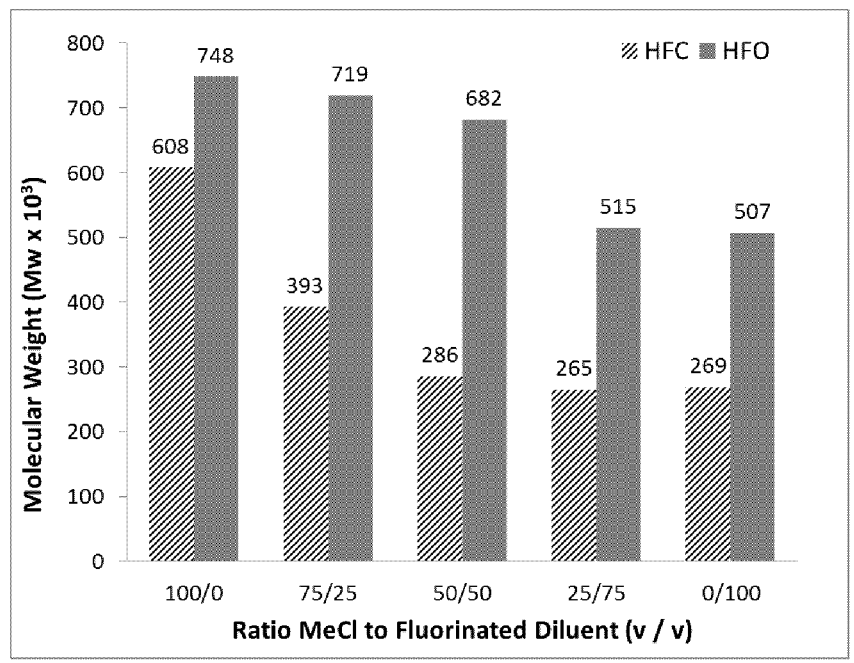
FIG. 1B depicts a graph showing molecular weight for polymers produced in various ratios of HFO-1234yf or HFC-134A with MeCl at −95° C.

In this specification including the claims, the use of the article "a", "an", or "the" in reference to an item is not intended to exclude the possibility of including a plurality of the item in some embodiments. It will be apparent to one skilled in the art in at least some instances in this specification including the attached claims that it would be possible to include a plurality of the item in at least some embodiments.

Butyl rubbers are formed by the copolymerization of at least one isoolefin monomer and at least one multiolefin monomer, and optionally further copolymerizable monomers.

The present invention is not limited to a special isoolefin. However, isoolefins within the range of from 4 to 16 carbon atoms, preferably 4-7 carbon atoms, such as isobutene, 2-methyl-1-butene, 3-methyl-1-butene, 2-methyl-2-butene, 4-methyl-1-pentene and mixtures thereof are preferred. More preferred is isobutene.

The present invention is not limited to a special multiolefin. Every multiolefin copolymerizable with the isoolefin known by those skilled in the art can be used. However, multiolefins within the range of from 4-14 carbon atoms, such as isoprene, butadiene, 2-methylbutadiene, 2,4-dimethylbutadiene, piperyline, 3-methyl-1,3-pentadiene, 2,4-hexadiene, 2-neopentylbutadiene, 2-methly-1,5-hexadiene, 2,5-dimethly-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof, preferably conjugated dienes, may be used. Isoprene is more preferably used. β-pinene can also be used as a co-monomer for the isoolefin.

Any monomer copolymerizable with the isoolefins and/or dienes known by those skilled in the art can be used as an alternative to the aforementioned multiolefins, or even in addition to the aforementioned multiolefins. Indene, styrene derivatives or mixtures thereof may be used in place of the multiolefins listed above or as optional additional monomers. α-Methyl styrene, p-methyl styrene, chlorostyrene or mixtures thereof are preferably used. p-Methyl styrene is more preferably used.

The polymerization of the butyl polymer is performed in the presence of a Lewis acid and an initiator capable of initiating the polymerization process. Suitable Lewis acids are those that readily dissolve in the selected diluent. Examples of suitable Lewis acids include ethyl aluminum dichloride (EADC), diethyl aluminum chloride (DEAC), titanium tetrachloride, stannous tetrachloride, boron trifluoride, boron trichloride, methylalumoxane and/or mixtures thereof. In some embodiments, $AlCl_3$ may also be used. Suitable initiators comprise a proton source and/or cationogen. A proton source suitable in the present invention includes any compound that will produce a proton when added to the selected Lewis acid. Protons may be generated from the reaction of the Lewis acid with proton sources such as water, hydrochloric acid (HCl), alcohol or phenol to produce the proton and the corresponding by-product. Such reaction may be preferred in the event that the reaction of the proton source is faster with the protonated additive as compared with its reaction with the monomers. Other proton generating reactants include thiols, carboxylic acids, and the like. The most preferred Lewis acid comprises a mixture of EADC and DEAC and the most preferred proton source is HCl. The preferred ratio of EADC/DEAC to HCl is between 5:1 to 100:1 by weight.

In addition or instead of a proton source a cationogen capable of initiating the polymerization process can be used. Suitable cationogen includes any compound that generates a carbo-cation under the conditions present. A preferred group of cationogens include carbocationic compounds having the formula:

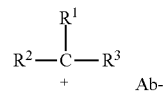

wherein $R^1$, $R^2$ and $R^3$, are independently hydrogen, or a linear, branched or cyclic aromatic or aliphatic group, the proviso that only one of $R^1$, $R^2$ and $R^3$ may be hydrogen. Preferably, $R^1$, $R^2$ and $R^3$, are independently a $C_1$ to $C_{20}$ aromatic or aliphatic group. Non-limiting examples of suitable aromatic groups are phenyl, tolyl, xylyl and biphenyl. Non-limiting examples of suitable aliphatic groups include methyl, ethyl, propyl, butyl, pentyl, hexyl, octyl, nonyl, decyl, dodecyl, 3-methylpentyl and 3,5,5-trimethylhexyl.

Another preferred group of cationogens includes substituted silylium cationic compounds having the formula:

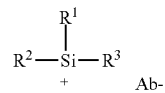

wherein $R^1$, $R^2$ and $R^3$, are independently hydrogen, or a linear, branched or cyclic aromatic or aliphatic group, with the proviso that only one of $R^1$, $R^2$ and $R^3$ may be hydrogen. Preferably, none of $R^1$, $R^2$ and $R^3$ is H. Preferably, $R^1$, $R^2$ and $R^3$ are, independently, a $C_1$ to $C_{20}$ aromatic or aliphatic group. More preferably, $R^1$, $R^2$ and $R^3$ are independently a $C_1$ to $C_8$ alkyl group. Examples of useful aromatic groups are phenyl, tolyl, xylyl and biphenyl. Non-limiting examples of useful aliphatic groups include methyl, ethyl, propyl, butyl, pentyl, hexyl, octyl, nonyl, decyl, dodecyl, 3-methylpentyl and 3,5,5-trimethylhexyl. A preferred group of reactive substituted silylium cations include trimethylsilylium, triethylsilylium and benzyldimethylsilylium. Such cations may be prepared, for example, by the exchange of the hydride group of the $R^1R^2R^3Si$—H with a non-coordinating anion (NCA), such as $Ph_3C^+B(pfp)_4^-$ yielding compositions such as $R^1R^2R^3SiB(pfp)_4$ which in the appropriate solvent obtain the cation.

According to the present invention, Ab- denotes an anion. Preferred anions include those containing a single coordination complex possessing a charge bearing metal or metalloid core which is negatively charged to the extent necessary to balance the charge on the active catalyst species which may be formed when the two components are combined. More preferably Ab- corresponds to a compound with the general formula [MQ4]⁻ wherein M is a boron, aluminum, gallium or indium in the +3 formal oxidation state; and Q is independently hydride, dialkylamido, halide, hydrocarbyl, hydrocarbyloxide, halo-substituted hydrocarbyl, halo-substituted hydrocarbyloxide, or halo-substituted silylhydrocarbyl radicals.

Preferably, the monomer mixture to prepare the butyl polymer contains in the range of from about 80% to about 99% by weight of at least one isoolefin monomer and in the range of from about 1.0% to about 20% by weight of at least one multiolefin monomer and/or β-pinene. More preferably, the monomer mixture contains in the range of from 83% to 98% by weight of at least one isoolefin monomer and in the range of from 2.0% to 17% by weight of a multiolefin monomer or β-pinene. Most preferably, the monomer mixture contains in the range of from 85% to 97% by weight of at least one isoolefin monomer and in the range of from 3.0% to 15% by weight of at least one multiolefin monomer or β-pinene.

The monomers are generally polymerized cationically, preferably at temperatures in the range of from about −120° C. to about −50° C., preferably in the range of from about −100° C. to about −70° C., more preferably in a range of from about −98° C. to about −75° C., for example about −98° C. to about −90° C. The operating temperatures of about −98° C. and about −75° C. are particularly noteworthy. Preferred pressures are in the range of from 0.1 to 4 bar.

The use of a continuous reactor as opposed to a batch reactor seems to have a positive effect on the process. Preferably, the process is conducted in at least one continuous reactor having a volume of between 0.1 m³ and 100 m³, more preferable between 1 m³ and 10 m³. The continuous process is preferably performed with at least the following feed streams:
I) solvent/diluent comprising a tetraflourinated propene+ isoolefin (preferably isobutene)+multiolefin (preferably diene, such as isoprene); and,
II) initiator system comprising a Lewis acid and proton source.

For economical production, a continuous process conducted in slurry (suspension) in a diluent is desirable, as described in U.S. Pat. No. 5,417,930, the entire contents of which is herein incorporated by reference.

The diluent preferably comprises at least one hydrofluorinated olefin comprising at least three carbon atoms and at least three fluorine atoms, as described by Formula I:

$$C_xH_yF_z \qquad (I)$$

wherein x is an integer with a value of 3 or greater, z is an integer with a value of 3 or greater, and y+z is 2x. The value of x is preferably from 3 to 6, more preferably from 3 to 5, yet more preferably 3. The value of z is preferably from 3 to 8, more preferably from 4 to 6, yet more preferably 4. Y is an integer with a value of 2x-z and may be in the range of, for example 2 to 10, 3 to 9, 4 to 8 or 4 to 6. The value of y is preferably 2.

Examples of suitable diluents having three or more carbon atoms and three or more fluorine atoms include 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1,3,3,3-tetrafluoro-1-propene; 2,3,3,3-tetrafluoro-1-propene; 1,1,3,3-tetrafluoro-1-propene, 1,1,2,3-tetrafluoro-1-propene, 1,2,3,3-tetrafluoro-1-propene, 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof.

Examples of HFO's with four or more fluorine atoms and three or more carbon atoms are 1,3,3,3-tetrafluoro-1-propene; 2,3,3,3-tetrafluoro-1-propene; 1,1,3,3-tetrafluoro-1-propene, 1,1,2,3-tetrafluoro-1-propene, 1,2,3,3-tetrafluoro-1-propene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene;

1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1,1,1,2-tetrafluoro-2-butene; 1.1.1.3-tetrafluoro-2-butene; 1,1,1,4-tetrafluoro-2-butene; 1,1,2,3-tetrafluoro-2-butene; 1.1.2.4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof.

Tetrafluorinated propenes having four fluorine atoms and three carbon atoms are of particular note. Examples are 1,3,3,3-tetrafluoro-1-propene (HFO-1234ze), 2,3,3,3-tetrafluoro-1-propene (HFO-1234yf), 1,1,3,3-tetrafluoro-1-propene, 1,1,2,3-tetrafluoro-1-propene, 1,2,3,3-tetrafluoro-1-propene and mixtures thereof. Tetrafluorinated propenes can exist in either the Z or E isomeric forms or as a mixture of Z and E isomeric forms. 1,3,3,3-tetrafluoro-1-propene (HFO-1234ze) and 2,3,3,3-tetrafluoro-1-propene (HFO-1234yf) are especially preferred. HFO-1234yf (2,3,3,3-tetrafluoro-1-propene) is most preferred.

The diluent may also comprise one or more other inert solvents known to the person skilled in the art for butyl polymerization. Such other inert solvents may be, for example, halogenated hydrocarbons other than hydrofluorocarbons (e.g. methyl chloride, dichloromethane or mixtures thereof).

EXAMPLES

All polymerizations were done in a dried, inert atmosphere. The polymerizations were performed as batch reactions in 600 mL stainless steel reaction vessels, equipped with an overhead 4-blade stainless steel impeller driven by an external electrically driven stirrer. Reaction temperature was measured via a thermocouple. The reactor was cooled to the desired reaction temperature, listed in the Tables, by immersing the assembled reactor into a pentane cooling bath. The temperature of the stirred hydrocarbon bath was controlled to ±2° C. All apparatus in liquid contact with the reaction medium were dried at 150° C. for at least 6 hours and cooled in a vacuum-nitrogen atmosphere alternating chamber before use. High purity isobutene and methyl chloride were received from LANXESS manufacturing facility and used as is. The hydrofluorocarbon 1,1,1,2-tetrafluoroethane (>99.9% purity) (HFC-134a, Genetron@ 134a) and hydrofluoroolefins (E)-1,3,3,3-tetrafluoro-1-propene (>99.99% purity) (HFO-1234ze, Solstice@ 1234ze Refrigeration Grade) and 2,3,3,3-tetrafluoro-1-propene (>99.99% purity) (HFO-1234yf, Solstice@ 1234yf Automotive Grade) were purchased from Honeywell and were used as received. All were condensed and collected as liquids in the dry box. Isoprene (Sigma-Aldrich, >99.5% purity) was dried over activated 3A molecular sieves for several days and distilled under nitrogen. A 1.0 M solution of ethylaluminum dichloride in hexanes (Sigma-Aldrich) was used as received. A solution of HCl/$CH_2Cl_2$ was prepared by bubbling anhydrous HCl gas (Sigma-Aldrich, 99% purity) through a pre-dried Sure/Seal™ bottle containing anhydrous $CH_2Cl_2$ (VWR). The HCl/$CH_2Cl_2$ solution was then titrated using 0.1 N NaOH (VWR) standard solution to determine its concentration.

The slurry polymerizations were performed by charging the monomer, comonomer and liquefied diluent (specified in each of the examples) into a chilled reaction vessel at polymerization temperature and stirred at a predetermined stirring speed between 500 to 900 rpm. The initiator/coinitiator solutions were prepared in methyl chloride. The initiator/coinitiator solutions were prepared under the same temperature conditions as the reaction vessel by diluting the HCl/$CH_2Cl_2$ solution into an aliquot of methyl chloride and adding the 1.0 M solution of the ethylaluminum dichloride to a 1:4 molar ratio of HCl:EADC, followed by gentle swirling. The initiator/coinitiator solution was used immediately. The initiator/coinitiator solution was added to the polymerization using a chilled glass Pasteur pipette. The reaction was allowed to run for 5 minutes and stopped by the addition of 2 mL of a 1% sodium hydroxide in ethanol solution. Conversion is reported as weight percent of the monomers converted to polymer at the polymerization temperature.

The molecular weight of the polymers was determined by GPC (gel permeation chromatography) using a Waters 2690/5 Separations Module and a Waters 2414 Refractive Index Detector. Tetrahydrofuran was used as eluent (0.8 mL/min, 35° C.) with a series of three Agilent PL gel 10 μm Mixed-B LS 300×5.7 mm columns.

Isoprene incorporation was determined by $^1$H-NMR spectrometry. NMR measurements were obtained using a Bruker DRX 500 MHz spectrometer (500.13 MHz) using $CDCl_3$ solutions of polymers with the residual $CHCl_3$ peak used as an internal reference.

Oligomer level determination was performed by GC-FID using an Agilent 6890 Series Plus using an Agilent J+W VF-1 ms 30×0.25 (1.0) column (inlet 275° C., 22.5 psi) and an FID temperature of 300° C. equipped with a HP 7683 Series auto injector.

Example A

Polymerizations with Pure Diluents at −95° C.

Table 1 lists the results of polymerizations conducted at −95° C. in methyl chloride (Examples 1 and 2), HFO-1234ze (Examples 3 and 4), HFO-1234yf (Examples 5 and 6) and HFC-134a (Examples 7 and 8). All polymerizations were performed consistently as reported above in a 600 mL stainless steel vessel using HCl/EADC as the initiator/coinitiator. Polymerizations were run with 180 mL diluent, 20 mL of isobutene and 0.6 mL of isoprene (isoprene content in feed=2.3 mol %). The initiator/coinitiator solution was prepared in 40 mL MeCl using 6 mL of a 0.16 M HCl/$CH_2Cl_2$ solutions and 4 mL of a 1.0 M hexane solution of ethylaluminum dichloride (EADC). The same volume of initiator/coinitiator solution (5 ml) was used in all examples in Table 1, which also provides more details on oligomer composition in each example.

TABLE 1

| Ex. | Diluent | Vol (%) | Yield (g) | Conversion (Wt. %) | Mw ×10³ | Mw/Mn | Total Unsats[1] (mol %) | Oligomers (ppm) | C21/C13 Ratio |
|---|---|---|---|---|---|---|---|---|---|
| 1 | CH$_3$Cl | 100 | 13.2 | 86 | 538 | 5.2 | 1.78 | 9274 | 1.18 |
| 2 | CH$_3$Cl | 100 | 13.9 | 94 | 595 | 5 | 1.75 | 7436 | 1.09 |
| 3 | HFO-1234ze | 100 | 4.4 | 30 | 477 | 6.3 | 2.03 | 1094 | 3.64 |
| 4 | HFO-1234ze | 100 | 4.6 | 31 | 465 | 6.1 | 2.12 | 865 | 2.95 |
| 5 | HFO-1234yf | 100 | 12.1 | 82 | 445 | 3.6 | 2.24 | 637 | 1.47 |
| 6 | HFO-1234yf | 100 | 12.4 | 84 | 479 | 3.6 | 2.26 | 632 | 1.32 |
| 7 | HFC-134a | 100 | 4.7 | 31 | 266 | 6.5 | 1.69 | 3004 | 8.19 |
| 8 | HFC-134a | 100 | 5.4 | 37 | 280 | 6.7 | 1.83 | 2726 | 7.11 |

[1]Total unsats = 1,4-isoprene + isoprenoid.

With reference to FIG. 1A, polymerization in HFO-1234yf shows an excellent temperature profile with a moderate temperature spike and extended reaction time in comparison to polymerizations in methyl chloride (MeCl).

Polymerizations using MeCl resulted in significant fouling around walls of the reaction vessel, temperature probe and stirring shaft as well as rubber ball formation in the reaction medium. Polymerizations using both hydrofluorocarbon and hydrofluoroolefins resulted in minimal or no fouling on the reaction vessel, temperature probe and stirring shaft. The HFO-1234yf produced a very stable, uniform rubber slurry with no polymer agglomeration.

Under the same reaction conditions at −95° C. reaction temperature, the polymerization reactivity in HFO-1234yf is excellent (av. 83% conversion) and is quite comparable albeit slightly lower than that of the conventional diluent methyl chloride (av. 90% conversion). However, the results show a marked difference in polymerization reactivity for hydrofluorocarbon HFC-134a vs hydrofluoroolefin HFO-1234yf. The reactions done in HFO-1234yf (av. 83% conversion) give much higher polymer yield than that of HFC-134a (av. 34% conversion). The hydrofluoroolefin isomer (E) HFO-1234ze shows polymerization reactivity (av. 30% conversion) similar to that of HFC-134a.

In addition to the high polymer conversions, the butyl polymer samples obtained from HFO-1234yf diluent give the best combination of properties such as high molecular weight, narrow molecular weight distribution, high isoprene incorporation and low levels of the cylic oligomer by-products (Table 1). It is clearly seen that rubber produced using HFO-1234yf as diluent have significantly higher weight-average molecular weight (M$_w$) than that produced in HFC-134A, similar Mw to that produced in HFO-1234ze and lower M$_w$ to that produced in MeCl. When comparing the average of duplicate reactions, the M$_w$ achieved for HFO-1234yf polymerizations performed at −95° C. (Ex. 5 & 6) was 462,000 compared to averages of 567,000 for MeCl (Ex. 1 & 2), 273,000 for HFC-134A (Ex. 7 & 8) and 471,000 for HFO1234ze (Ex. 3 & 4).

It is well known that cyclic oligomers namely C$_{13}$H$_{24}$ and C$_{21}$H$_{40}$ compounds are inherently formed as by-products during butyl polymerization process. The molecular structures of these cyclic oligomers are shown below in Scheme 1 where the C$_{13}$H$_{24}$ isomer contains 1 molecule of isoprene and 2 molecules of isobutylene and the C$_{21}$H$_{40}$ isomer contains 1 molecule of isoprene and 4 molecules of isobutylene. These cyclic oligomers exist in trace amounts in regular butyl finished products. The presence of C$_{13}$H$_{24}$ and C$_{21}$H$_{40}$ in butyl rubber is of current concern in the pharmaceutical application. These species are the major extractables in certain pharma rubber closure formulations.

Scheme 1 - Molecular Structures of Cyclic Oligomers

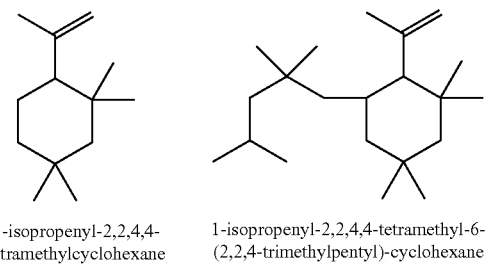

1-isopropenyl-2,2,4,4-tetramethylcyclohexane 1-isopropenyl-2,2,4,4-tetramethyl-6-(2,2,4-trimethylpentyl)-cyclohexane In addition to providing surprisingly low levels of oligomers, use of tetraflourinated propene diluents also resulted in a surprisingly favourable ratio of C21/C13 oligomers. For example, use of HFO-1234yf provided ratios of 1.32 and 1.47, whereas use of HFC-134a provided ratios of 7.11 and 8.19. Since the lower molecular weight C13 oligomers are preferentially removed during steam stripping and rubber drying operations, a low ratio is advantageous in that a finished product can be made with even lower levels of total oligomers.

While HFO-1234ze diluent tends to give lower copolymer conversions, the butyl polymer samples produced from this diluent shows excellent properties in terms of molecular weight, isoprene incorporation and cylic oligomers content. Overall, both tetrafluorinated propenes, HFO-1234yf and HFO-1234ze, show better behavior and are more suitable for butyl slurry polymerization than HFC-134a at low temperatures.

Although the NMR data is not presented here, overall it was found that lower polymer branching occurred when HFO-1234yf diluents were used, while HFO-1234ze diluents produced polymers with similar branching to HFC-134a diluents.

Example B

Polymerizations with Pure Diluents at −75° C.

Table 2 lists the results of polymerizations conducted at −75° C. in methyl chloride (Examples 9 and 10), HFO- 1234ze (Examples 11 and 12), HFO-1234yf (Examples 13 and 14) and HFC-134a (Examples 15 and 16). All polymerizations were performed consistently as reported above in a 600 mL stainless steel vessel using HCl/EADC and the initiator/coinitiator. Polymerizations were run with 180 mL diluent, 20 mL of isobutene and 0.6 mL of isoprene (isoprene content in feed =2.3 mol %). The initiator/coinitiator solution was prepared in 40 mL MeCl using 6 mL of a 0.16 M HCl/CH$_2$Cl$_2$ solutions and 4mL of a 1.0 M hexane solution of ethylaluminum dichloride (EADC). The same volume of initiator/coinitiator solution (5 mL) was used for all polymerizations.

The total unsaturation level and therefore the isoprene level is much higher in butyl polymer samples produced in HFO-1234yf vs. methyl chloride. As seen in Tables 1 and 2, rubber produced using HFO-1234yf as diluent contains significantly more unsaturation from incorporated isoprene than compared to the other diluents when using an equal concentration of isoprene in the mixed feed for the reaction. When comparing the average of duplicate reactions, the total unsaturation achieved for HFO-1234yf polymerizations performed at −95° C. (Ex. 5 & 6) was 2.25 mol % compared to averages of 1.77 mol % for MeCl (Ex. 1 & 2), 1.76 mol % for HFC-134A (Ex. 7 & 8) and 2.08 mol % for HFO-1234ze

TABLE 2

| Ex. | Diluent | Vol (%) | Yield (g) | Conversion (Wt. %) | Mw ×10$^3$ | Mw/Mn | Total Unsats[1] (mol %) | Oligomers (ppm) | C21/C13 Ratio |
|---|---|---|---|---|---|---|---|---|---|
| 9 | CH$_3$Cl | 100 | 13.6 | 92 | 294 | 5.11 | 1.44 | 22522 | 1.94 |
| 10 | CH$_3$Cl | 100 | 13.7 | 93 | 344 | 5.51 | 1.44 | 22316 | 1.90 |
| 11 | HFO-1234ze | 100 | 1.6 | 11 | 220 | 8.00 | 1.68 | 12774 | 6.77 |
| 12 | HFO-1234ze | 100 | 1.5 | 10 | 212 | 9.45 | 1.68 | 15443 | 6.34 |
| 13 | HFO-1234yf | 100 | 12.2 | 83 | 331 | 3.79 | 2.12 | 4321 | 1.39 |
| 14 | HFO-1234yf | 100 | 13 | 88 | 410 | 3.83 | 2.09 | 3036 | 1.24 |
| 15 | HFC-134a | 100 | 13 | 88 | 267 | 3.79 | 1.95 | 3392 | 1.57 |
| 16 | HFC-134a | 100 | 13.2 | 89 | 222 | 3.83 | 2.05 | 4905 | 1.75 |

[1]Total unsats = 1,4-isoprene + isoprenoid.

At a higher reaction temperature of −75° C., the polymerization becomes much more reactive in HFC-134a, the conversion levels (av. 89% conversion) are now comparable to that of HFO-1234yf (av. 85% conversion). The experiments carried out in HFC-134a and HFO-1234yf shows comparable reactivity; however both of these diluents show slightly lower reaction conversions than the conventional diluent methyl chloride. The temperature has no impact on the HFO-1234ze as this diluent still exhibits poor reactivity despite a higher reaction temperature.

At the higher polymerization temperature the polymer produced in HFO-1234yf possessed the highest Mw. When comparing the averages for duplicate polymerizations performed at −75° C. HFO-1234yf (Ex. 13 & 14) produced polymer with Mw=371,000, HFC-134A (Ex. 15 & 16) Mw=245,000, HFO-1234ze (Ex. 11 & 12) Mw=216,000 and MeCl (Ex. 9 & 10) Mw=319,000. This is an important advantage for a continuous butyl production process, as a high Mw and related desirable physical properties can be maintained in the product even at higher reactor temperatures.

Comparing the data shown in Tables 1 and 2, the overall impact of higher reaction temperature is the reduction in the polymer chain molecular weights (Mw) and a significant increase in the cyclic oligomers content. The effects follow the same trends for all diluents, however the butyl polymer samples produced from HFO-1234yf maintain higher polymer molecular weights relative to HFC-134a. The total unsaturation level is slightly higher for HFO-1234yf (av. 2.1 mol %) vs. HFC-134a (av. 2.0 mol %), whereas the cyclic oligomer level is lower for HFO-1234yf (av. 3679 ppm) vs. HFC-134a (av. 4148 ppm). The ratio of C$_{21}$/C$_{13}$ is more favourable with HFO-1234yf than with HFC-134a. Similarly, observations can be made comparing HFO-1234yf vs. methyl chloride with regard to the copolymer molecular weights.

(Ex. 3 & 4). Isoprene incorporation for HFC-134A is limited at −95° C. due to low conversions at this temperature. The same trends exist when comparing the averages for duplicate polymerizations performed at high temperature (−75° C.), with HFO-1234yf (Ex. 13 & 14) incorporating on average 2.11 mol % total isoprene, HFC-134A (Ex. 15 & 16) 2.00 mol %, HFO-1234ze (Ex. 11 & 12) 1.68 mol % and MeCl (Ex. 9 & 10) 1.44mol %. Isoprene incorporation for HFO-1234ze is limited at −75° C. due to low conversions at this temperature. The improved incorporation of isoprene into the butyl rubber results in a lower concentration of isoprene required in the feed stream to reach equivalent unsaturation levels in the finished product, resulting in cost savings for a continuous slurry manufacturing process. In addition, the cyclic oligomer levels are notably higher in methyl chloride vs. HFO-1234yf and HFC-134a and the C$_{21}$/C$_{13}$ ratios are also undesirably higher. Overall, the polymerization behavior and the advantages of HFO-1234yf are applicable under different reaction temperatures, i.e. at −95° C. and −75° C.

Example C

Polymerizations with 50:50 Mixtures of Diluents at −95° C.

Table 3 lists the results of polymerizations conducted at −95° C. in 50:50 mixture of MeCl:HFO-1234ze (Examples 17 and 18) and 50:50 mixture of MeCl:HFO-1234yf (Examples 19 and 20). All polymerizations were performed consistently as reported above in a 600 mL stainless steel vessel using HCl/EADC and the initiator/coinitiator. Polymerizations were run with 180 mL diluent, 20 mL of isobutene and 0.6 mL of isoprene (isoprene content in feed=2.3 mol %). The initiator/coinitiator solution was prepared in 40 mL MeCl using 6 mL of a 0.16 M HCl/CH$_2$ Cl$_2$ solutions and 4 mL of a 1.0M hexane solution of ethylaluminum dichloride (EADC). The same volume of initiator/coinitiator solution (5 mL) was used for all polymerizations.

TABLE 3

| Ex. | Diluent | Vol (%) | Yield (g) | Conversion (Wt. %) | Mw ×10$^3$ | Mw/Mn | Total Unsats[1] (mol %) | Oligomers (ppm) | C21/C13 Ratio |
|---|---|---|---|---|---|---|---|---|---|
| 17 | CH$_3$Cl/ HFO-1234ze | 50/50 | 4.8 | 33 | 243 | 4.18 | 1.39 | 5489 | 2.77 |
| 18 | CH$_3$Cl/ HFO-1234ze | 50/50 | 6.1 | 42 | 238 | 4.13 | 1.46 | 4621 | 2.25 |
| 19 | CH$_3$Cl/ HFO-1234yf | 50/50 | 11.1 | 75 | 458 | 4.61 | 1.74 | 3334 | 1.52 |
| 20 | CH$_3$Cl/ HFO-1234yf | 50/50 | 9.1 | 62 | 455 | 5.02 | 1.62 | 3509 | 1.90 |

[1]Total unsats = 1,4-isoprene + isoprenoid.

At −95° C. reaction temperature, the polymerizations using mixtures of diluent produced, in general, similar trends as those observed in pure diluent. Thus, the reactions in the 50:50 blend of methyl chloride/ HFO-1234yf (av. 68% conversion) are more reactive than the blends of methyl chloride/HFO-1234ze (av. 38% conversion). The butyl polymer samples obtained from methyl chloride/HFO-1234yf also exhibit higher molecular weights and higher isoprene incorporation than in the methyl chloride/HFO-1234ze diluent mixture. The cyclic oligomer levels are lower for methyl chloride/HFO-1234yf than in the case of methyl chloride/HFO-1234ze. Additionally, the ratio of C21/C13 is lower for methyl chloride/HFO-1234yf compared to the methyl chloride/HFO-1234ze-containing diluent mixture.

The butyl rubber produced in a MeCl blend with HFO-1234yf possessed significantly higher Mw than in HFO-1234ze. When comparing the averages for duplicate polymerizations performed at −95° C. blends of MeCl with HFO1234yf (Ex. 19 & 20) produced polymer with Mw=457,000 while HFO1234ze (Ex. 17 & 18) produced polymer with Mw=241,000. This is an important advantage for the continuous slurry process for butyl rubber production. A high Mw can be maintained even with a blend of HFO-1234yf with MeCl, resulting in lower operating costs compared to 100% HFO-1234yf without loss of other advantages of the fluorinated diluent system. Minimal to no fouling was observed on the surfaces in contact with the reaction mixtures for all cases. In comparison, the polymerization in methyl chloride resulted in a heavy coating of polymer on the reactor walls, temperature probe and stirring shaft as well as large amounts polymer agglomerate in the reaction medium.

Example D

Polymerizations with 50:50 Mixtures of Diluents at −75° C.

Table 4 lists the results of polymerizations conducted at −75° C. in a 50:50 mixture of MeCl:HFO-1234ze (Examples 21 and 22) and 50:50 mixture of MeCl:HFO-1234yf (Examples 23 and 24). All polymerizations were performed consistently as reported above in a 600 mL stainless steel vessel using HCl/EADC and the initiator/coinitiator. Polymerizations were run with 180 mL diluent, 20 mL of isobutene and 0.6 mL of isoprene (isoprene content in feed=2.3 mol %). The initiator/coinitiator solution was prepared in 61 mL MeCl using 11 mL of a 0.18 M HCl/CH$_2$Cl$_2$ solutions and 8 mL of a 1.0 M hexane solution of ethylaluminum dichloride (EADC). The same volume of initiator/coinitiator solution (5 mL) was used for all polymerizations.

TABLE 4

| Ex. | Diluent | Vol (%) | Yield (g) | Conversion (Wt. %) | Mw ×10$^3$ | Mw/Mn | Total Unsats[1] (mol %) | Oligomers (ppm) | C21/C13 Ratio |
|---|---|---|---|---|---|---|---|---|---|
| 21 | CH$_3$Cl/ HFO-1234ze | 50/50 | 3.6 | 25 | 145 | 4.18 | 1.2 | 15925 | 5.06 |
| 22 | CH$_3$Cl/ HFO-1234ze | 50/50 | 1.8 | 12 | 106 | 1.83 | 1.08 | 18877 | 6.20 |
| 23 | CH$_3$Cl/ HFO-1234yf | 50/50 | 13.0 | 88 | 310 | 4.89 | 1.45 | 19588 | 2.35 |
| 24 | CH$_3$Cl/ HFO-1234yf | 50/50 | 13.1 | 89 | 275 | 5.18 | 1.42 | 21730 | 2.36 |

[1]Total unsats = 1,4-isoprene + isoprenoid.

The polymerizations using a mixture of diluents at −75° C. produced significant fouling for all mixtures of diluent. MeCl/HFO-1234ze mixture resulted in a polymer solely fouled around the stirring shaft, while MeCl/HFO-1234yf resulted in the heavy fouling on the stirring shaft along with the formation of rubber balls in the reaction medium. In comparison, the polymerization in methyl chloride resulted in a heavy coating of polymer on the reactor walls, temperature probe and stirring shaft as well as large amounts of polymer agglomerate in the reaction medium.

Again in this case, the temperature has relatively little impact on polymer conversions for the reactions involving methyl chloride/HFO-1234ze. The highest conversions and molecular weights were obtained with methyl chloride/HFO-1234yf.

The butyl rubber produced in a blend with HFO-1234yf possessed higher Mw than in HFO-1234ze. When comparing the averages for duplicate polymerizations performed at −75° C. blends of MeCl with HFO-1234yf (Ex. 21 & 22) produced polymer with Mw=457,000 while HFO-1234ze (Ex. 23 & 24) produced polymer with Mw=241,000. This is an important advantage for the continuous slurry process for butyl rubber production, proving that high Mw is maintained even at higher polymerization temperatures with a blend of HFO-1234yf in MeCl.

Example E

Effect of Steam Stripping on Polymers to Reduce C13 Cyclic Oligomer Content

For polymers produced according to selected experimental conditions, steam stripping was performed as a finishing step to reduce the C13 cyclic oligomer content and thereby reduce the total extractable cyclic oligomers from the polymer. This finishing step takes advantage of the favourably low ratio of C21/C13 observed for polymers produced using the HFO's of the present invention in order to produce polymers with desirable reduced total oligomer content.

For each sample, 2 g of polymer (that had been previously coagulated in ethanol and evaporated at room temperature) was dissolved in 20 mL of hexane. It should be noted that the ethanol coagulation step resulted in some extraction of cyclic oligomers; this resulted in lower initial total oligomer levels and a higher ratio of C21/C13 for these samples than reported above. The hexane solvent dissolved the C13 oligomers from the sample and the solvent was removed, along with the oligomers, by steam stripping for thirty minutes. The polymer was recovered and re-dissolved in hexane for subsequent oligomer analysis by GC/MS. Results of the analysis are provided in Table 5.

TABLE 5

| Ex. | Diluent | Total oligomer (ppm) before stripping | C21/C13 ratio before stripping | Total oligomer (ppm) after stripping | C21/C13 ratio after stripping |
|---|---|---|---|---|---|
| 5 | HFO-1234yf @ −95° C. | 165 | 3.7 | 124 | 7.2 |
| 8 | HFC-134a @ −95° C. | 242 | 7.9 | 209 | 16.4 |
| 14 | HFO-1234yf @ −75° C. | 242 | 4.1 | 213 | 7.9 |
| 16 | HFC-134a @ −75° C. | 417 | 6.3 | 346 | 10.89 |

By utilizing steam stripping as a finishing process, it was possible to produce polymers with a low total oligomer content from polymers created using the HFO diluent. As can be seen from Table 5, steam stripping reduced the total oligomer content of the samples produced using HFO-1234yf diluent to a lower level than those produced using HFC-134a diluent. Although a reduction in cyclic oligomer levels was observed for polymers produced at all temperatures, it was most pronounced for those produced at the lower temperature of −95° C., since the ratio of $C_{21}/C_{13}$ was favourable for HFO diluents at that temperature. The lowest overall cyclic oligomer levels were obtained with polymer produced using HFO-1234yf at −95° C. Using the steam stripping process, a butyl polymer with total cyclic oligomers of less than 125 ppm was produced. Since the $C_{13}$ was extracted, in all cases the ratio of $C_{21}/C_{13}$ increased following steam stripping. The polymers produced using the steam stripping finishing process are novel in that they possess the highest purity and lowest overall level of total cyclic oligomers, which is advantageous in pharmaceutical applications.

Series of polymerizations were performed in methyl chloride (MeCl), HFC-134A and HFO1234yf as diluents at various isoprene contents in the reaction feed. The polymerizations were conducted as described previously except 1.5 mL of isoprene was used in the feed for the high isoprene polymerizations (isoprene content in feed=5.6 mol %). The oligomer content was measured for samples of polymer taken directly from the reaction vessel or after steam stripping the reaction mixture in order to mimic conditions in a plant production process. Results are shown in Table 6.

TABLE 6

| Ex. | Diluent | Isoprene Content in Feed (mol %) | Total Unsats[1] (mol %) | Conversion (Wt %) | Sample Prep [2] | C13 (ppm) | C21 (ppm) | Total Oligomers[2] (ppm) | C21/C13 Ratio |
|---|---|---|---|---|---|---|---|---|---|
| 25 | CH$_3$Cl | 2.3 | 1.42 | 49 | Direct | 1493 | 3585 | 5078 | 2.4 |
|  |  |  |  |  | Steam | 1101 | 3490 | 4591 | 3.2 |
| 26 | CH$_3$Cl | 5.6 | 6.63 | 71 | Direct | 7237 | 7612 | 14849 | 1.1 |
|  |  |  |  |  | Steam | 5092 | 6824 | 11916 | 1.3 |
| 27 | HFC-134A | 2.3 | 1.84 | 58 | Direct | 367 | 2263 | 2630 | 6.2 |
|  |  |  |  |  | Steam | 192 | 1874 | 2066 | 9.8 |
| 28 | HFC-134A | 5.6 | 4.98 | 81 | Direct | 1202 | 1465 | 2667 | 1.2 |
|  |  |  |  |  | Steam | 694 | 1326 | 2021 | 1.9 |
| 29 | HFO-1234yf | 2.3 | 2.22 | 65 | Direct | 254 | 368 | 622 | 1.4 |
|  |  |  |  |  | Steam | 143 | 329 | 472 | 2.3 |
| 30 | HFO-1234yf | 5.6 | 6.14 | 38 | Direct | 833 | 1152 | 1986 | 1.4 |
|  |  |  |  |  | Steam | 538 | 1075 | 1614 | 2.0 |

[1]Total unsats = 1,4-isoprene + isoprenoid.
[2]Oligomers measured on samples directly from polys reactor or after steam stripping.

Figure 2:
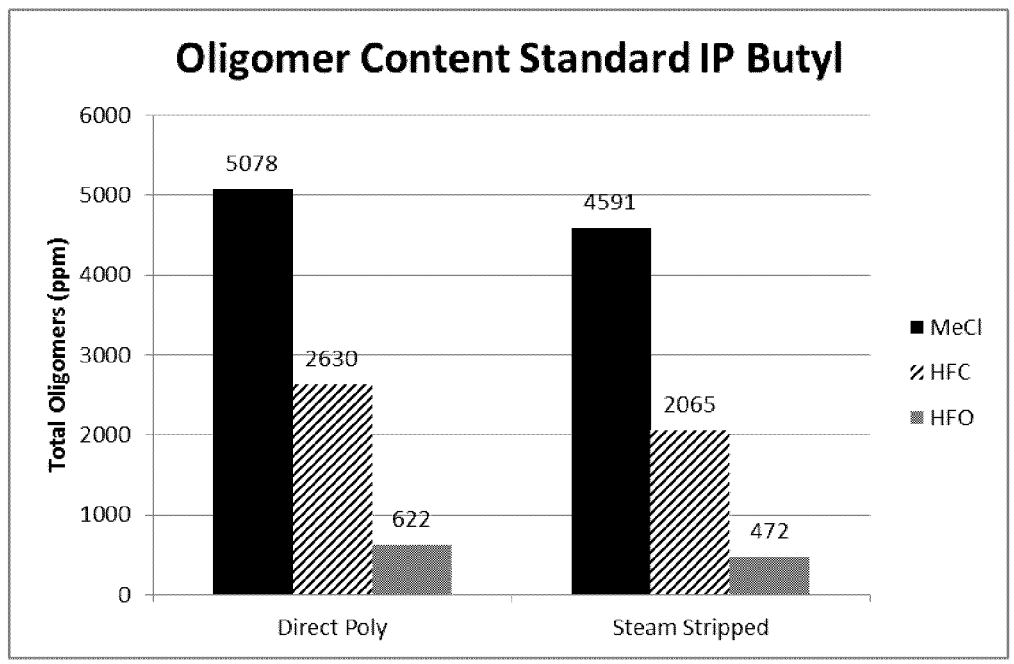
FIG. 2 depicts a graph of total oligomer content in butyl rubber produced in MeCl, HFC-134A and HFO-1234yf at standard isoprene levels (2.3 mol % feed ratio).

As seen in Table 6, the use of HFO1234yf as a diluent for polymerization results in butyl rubber with significantly lower amounts of cyclic oligomers as compared to MeCl and HFC-134A. The oligomer levels measured for the samples removed directly from the polymerization are a true measure of the total oligomers formed during the reaction. The oligomer data presented in Table 6 for samples removed directly from the polymerization show the same trends as that observed in the data in Table 5. It is clearly seen that rubber produced using HFO1234yf (Ex. 29) as diluent contains significantly less total oligomer than that produced in MeCl (Ex. 25) or HFC-134A (Ex. 27). FIG. 2 compares the total oligomer content for reactions performed with standard isoprene levels (Examples 25, 27 and 29). The steam stripping purification step was performed in order to estimate the product purification occurring in a continuous butyl rubber manufacturing process. The steam stripping step is observed to decrease the $C_{13}$ content more preferentially for butyl rubber produced in all diluents at similar rates. This is expected as the $C_{13}$ oligomers are known to be steam stripped during the finishing process.

Figure 3:
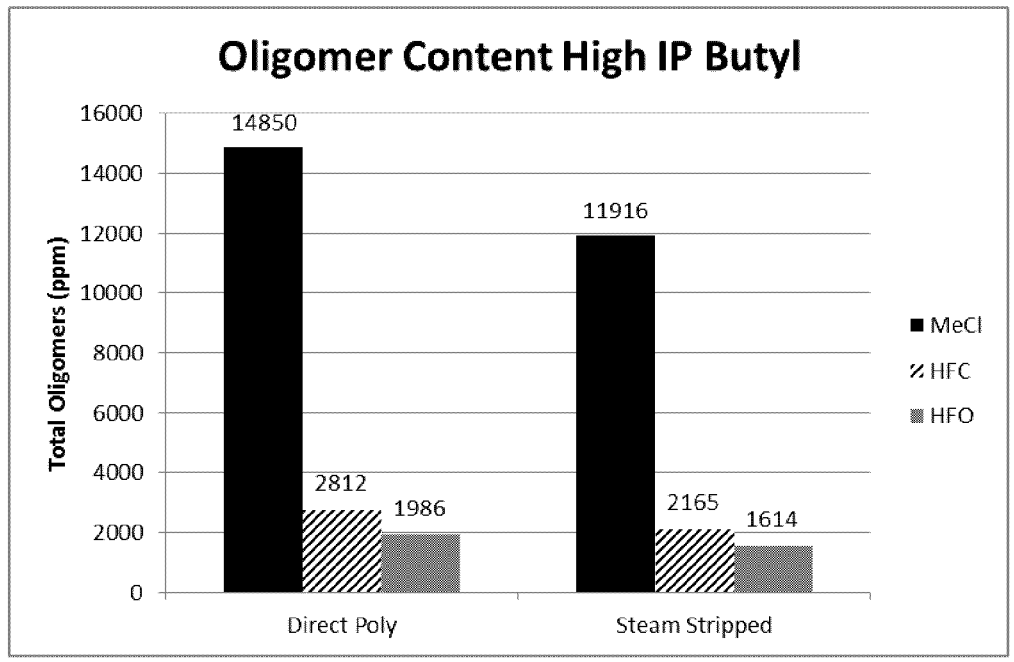
FIG. 3 depicts a graph of total oligomer content in butyl rubber produced in MeCl, HFC-134A and HFO-1234yf at high isoprene levels (5.6 mol % feed ratio).

As further seen in Table 6, the use of HFO1234yf as a diluent for polymerization results in butyl rubber with significantly lower amounts of cyclic oligomers as compared to MeCl and HFC-134A at higher levels of isoprene incorporation. Polymerizations were performed in the presence of increased feed concentrations of isoprene with the various diluents in order to produce butyl rubber with a high incorporated isoprene content. Similar to that observed for reactions performed at standard isoprene levels, a low oligomer content was achieved in the diluent HFO-1234yf (Ex. 30) as compared to MeCl (Ex. 26) or HFC-134A (Ex. 28). FIG. 3 compares the total oligomer content for high-isoprene feed content reactions. Following steam stripping, the polymer formed in HFO-1234yf diluent with high isoprene incorporation contained significantly lower oligomer than that measured for purified polymer prepared in HFC-134A and MeCl.

Figure 4:
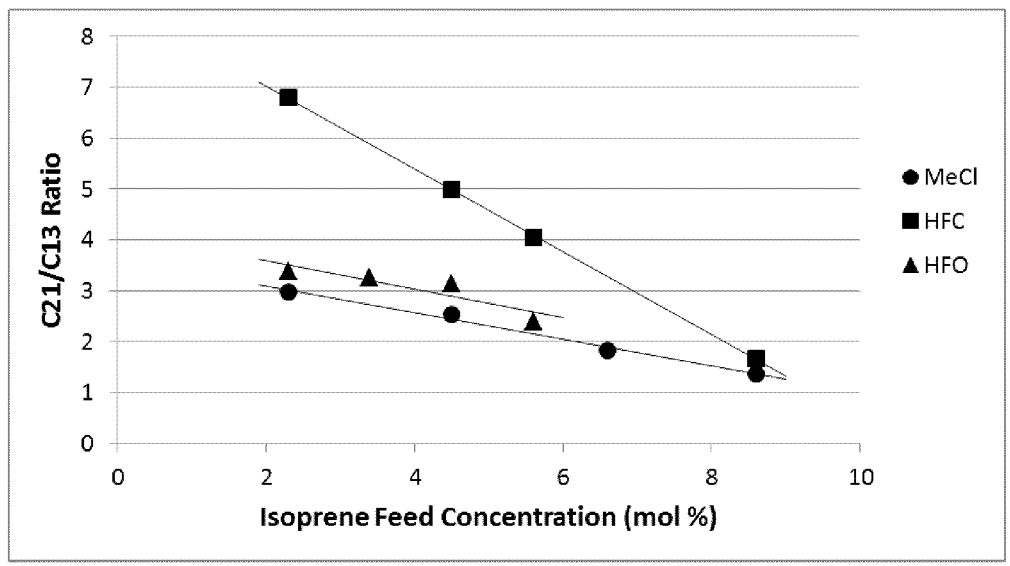
FIG. 4 depicts a graph showing C21/C13 oligomer ratio in butyl rubber produced in MeCl, HFC-134A and HFO-1234yf at −95° C. using various feed isoprene concentrations.

As seen in Table 7 and FIG. 4, the use of HFO-1234yf as a diluent in polymerization reactions results in lower C21/C13 oligomer ratio as compared to HFC-134A in the range of isoprene contents from 0-8 mol %. Polymerizations were performed with various ratios of isoprene in the monomer feed as listed in Table 7 (Examples 31-42), and the ratio of C21 to C13 oligomers measured for polymer sampled directly out of the reactor is compared for polymerizations performed with feed isoprene concentrations varying from 2.3 to 8.6 mol % in FIG. 4. A lower C21/C13 ratio is observed for butyl produced in HFO-1234yf as compared to HFC-134A at all levels of isoprene. The C21/C13 ratio is observed to be quite similar for HFO-1234yf materials as compared to reactions performed in MeCl. It is known that the C13 oligomers are preferentially removed during rubber separation and drying processes in the continuous manufacturing process of butyl rubber. Therefore, a low C21/C13 ratio is desirable for butyl rubber sampled directly out of the polymerization reactor to yield finished product butyl rubber with low total oligomer content.

TABLE 7

| Ex. | Diluent | Isoprene Content in Feed | Total Unsats[1] (mol %) | Conversion (%) | C13 (ppm) | C21 (ppm) | Total Oligomers[2] (ppm) | C21/C13 Ratio |
|---|---|---|---|---|---|---|---|---|
| 31 | CH$_3$Cl | 2.3 | 1.3 | 51 | 1915 | 5696 | 7611 | 3.0 |
| 32 | | 4.5 | 2.5 | 40 | 2829 | 7148 | 9977 | 2.5 |
| 33 | | 6.6 | 3.9 | 39 | 3549 | 6509 | 10058 | 1.8 |
| 34 | | 8.6 | 5.1 | 38 | 4196 | 5744 | 9940 | 1.4 |
| 35 | HFC-134A | 2.3 | 2.0 | 31 | 311 | 2116 | 2427 | 6.8 |
| 36 | | 4.5 | 3.9 | 30 | 486 | 2419 | 2905 | 5.0 |
| 37 | | 5.6 | 4.8 | 31 | 582 | 2355 | 2937 | 4.1 |
| 38 | | 8.6 | 7.8 | 77 | 959 | 1601 | 2559 | 1.7 |
| 39 | HFO-1234yf | 2.3 | 1.9 | 29 | 417 | 1408 | 1825 | 3.4 |
| 40 | | 3.4 | 3.0 | 22 | 646 | 2099 | 2714 | 3.2 |
| 41 | | 4.5 | 4.0 | 13 | 848 | 2659 | 3507 | 3.1 |
| 42 | | 5.6 | 4.9 | 14 | 1855 | 4446 | 6301 | 2.4 |

[1]Total unsats = 1,4-isoprene + isoprenoid
[2]Oligomers measured on samples directly from polys reactor or after steam stripping.

Example F

Decreased Isoprenoid Content in Butyl Rubber

Butyl rubbers produced in Examples 1-16 were analyzed in order to determine the effect of diluent on isoprenoid (short chain branching) content of the butyl copolymer. The results are provided in Table 8. Examples 1-16 are the same as in Tables 1 and 2 above.

TABLE 8

| Ex. | Diluent | Vol (%) | Reaction Temp (° C.) | Conversion (Wt. %) | Total Unsats[1] (mol %) | Isoprenoid Content[2] (%) |
|---|---|---|---|---|---|---|
| 1 | MeCl | 100 | −95 | 86 | 1.78 | 15 |
| 2 | MeCl | 100 | −95 | 94 | 1.75 | 14 |
| 3 | HFO-1234ze | 100 | −95 | 30 | 2.03 | 8 |
| 4 | HFO-1234ze | 100 | −95 | 31 | 2.12 | 8 |
| 5 | HFO-1234yf | 100 | −95 | 82 | 2.24 | 5 |
| 6 | HFO-1234yf | 100 | −95 | 84 | 2.26 | 5 |
| 7 | HFC-134a | 100 | −95 | 31 | 1.69 | 10 |
| 8 | HFC-134a | 100 | −95 | 37 | 1.83 | 10 |
| 9 | MeCl | 100 | −75 | 92 | 1.44 | 24 |
| 10 | MeCl | 100 | −75 | 93 | 1.44 | 23 |
| 11 | HFO-1234ze | 100 | −75 | 11 | 1.68 | 19 |
| 12 | HFO-1234ze | 100 | −75 | 10 | 1.68 | 18 |
| 13 | HFO-1234yf | 100 | −75 | 83 | 2.12 | 9 |
| 14 | HFO-1234yf | 100 | −75 | 88 | 2.09 | 8 |
| 15 | HFC-134a | 100 | −75 | 88 | 1.95 | 11 |
| 16 | HFC-134a | 100 | −75 | 89 | 2.05 | 12 |

[1]Total unsaturations = 1,4-isoprene (mol %) + isoprenoid (mol %).
[2]Isoprenoid Content = Isoprenoid (mol %)/Total Unsats (mol %).

As seen in table 8, rubber produced using 100% HFO-1234yf, HFC-134A or HFO-1234ze as diluent contain a lower measured isoprenoid content (short chain branching) compared to MeCl when using an equal concentration of isoprene in the mixed feed for the reaction. More significantly, it is seen when comparing the average of duplicate reactions that polymerizations in HFO-1234yf result in greatly reduced isoprenoid contents at −95° C. The isoprenoid content for polymer produced in HFO-1234yf at −95° C. (Ex. 5 & 6) was 5.0% compared to averages of 15% for MeCl (Ex. 1 & 2), 10% for HFC-134A (Ex. 7 & 8) and 8% for HFO-1234ze (Ex. 3 & 4). This is significant since a butyl copolymer with a lower isoprenoid content will have a higher proportion of total unsaturations available in a 1,4-unit orientation for further chemical modification, and is expected to have higher efficiency in subsequent halogenation reactions in order to produce halobutyl rubber.

Short chain branches arise from back-biting reactions of a reactive chain end onto itself to form 5 carbon side chains attached to a small proportion of the 1,4-isoprene units along the main chain. These substituted 1,4-isoprene units are referred to as isoprenoid units throughout this document. The proportion of these units is significant for the production of halobutyl rubber, since the substituted isoprenoid is not available for chemical modification by halogenation. As observed in Table 8, under standard butyl polymerization conditions using MeCl as diluent, the isoprenoid content of the butyl produced is 15%. Therefore, under these standard conditions only 85% of the added isoprene units are in the 1,4-unit configuration and available to participate in further polymer modification reactions such as halogenation. Therefore, it is expected that a halogenation process will proceed to higher efficiency with a butyl copolymer containing lower isoprenoid content, an important factor for the continuous production process of halobutyl rubber.

The same trends exist when comparing the averages for duplicate polymerizations performed at high temperature (−75° C.), with material prepared in HFO-1234yf (Ex. 13 & 14) containing on average 9.0% isoprenoid, HFC-134A (Ex. 15 & 16) 12%, HFO-1234ze (Ex. 11 & 12) 19% and MeCl (Ex. 9 & 10) 24%. This demonstrates that also at higher temperatures polymerizations performed in HFO-1234yf or HFC-134A produce butyl rubber containing significantly less short chain branching, and would be expected to undergo halogenation more efficiently than materials prepared in the other diluent systems.

A polymerization series was performed in pure diluents with a high content of isoprene in the reaction feed in order to prepare high isoprene butyl rubber. Table 9 lists the results of polymerizations conducted in pure diluents at −95° C. with either standard isoprene molar ratio in the feed (2.3 mol %) or high isoprene (5.6 mol %).

TABLE 9

| Ex. | Diluent | Isoprene Content in Feed (mol %) | Conversion (Wt. %) | Mw ×10$^3$ | Mw/Mn | Total Unsats[1] (mol %) | Isoprenoid Content[2] (%) |
|---|---|---|---|---|---|---|---|
| 1 | MeCl | 2.3 | 86 | 538 | 5.2 | 1.78 | 15 |
| 2 | MeCl | 2.3 | 94 | 595 | 5 | 1.75 | 14 |
| 43 | MeCl | 5.6 | 70 | 235 | 3.71 | 3.49 | 12 |
| 44 | MeCl | 5.6 | 71 | 246 | 4.13 | 3.42 | 12 |
| 45 | HFC-134A | 2.3 | 50 | 263 | 5.04 | 1.66 | 10 |
| 46 | HFC-134a | 2.3 | 58 | 278 | 5.30 | 1.63 | 9 |
| 47 | HFC-134a | 5.6 | 54 | 170 | 3.92 | 5.00 | 7 |
| 48 | HFC-134a | 5.6 | 52 | 172 | 3.85 | 4.92 | 8 |
| 49 | HFO-1234yf | 2.3 | 87 | 413 | 4.56 | 1.99 | 6 |
| 50 | HFO-1234yf | 2.3 | 83 | 447 | 4.07 | 1.97 | 6 |
| 51 | HFO-1234yf | 5.6 | 47 | 240 | 4.07 | 5.40 | 6 |
| 52 | HFO-1234yf | 5.6 | 47 | 261 | 4.30 | 5.11 | 5 |

[1]Total unsaturations = 1,4-isoprene (mol %) + isoprenoid (mol %).
[2]Isoprenoid Content = Isoprenoid (mol %)/Total Unsats (mol %).

As seen in Table 9, rubber produced at −95° C. using HFO-1234yf as diluent (Ex. 49 & 50) or HFC-134A (Ex. 45 & 46) contains lower isoprenoid content than MeCl (Ex. 1 & 2) at standard isoprene ratio in the mixed feed (2.3 mol %). Also, rubber produced using HFO-1234yf as diluent (Ex. 49 & 50) contains lower isoprenoid content than HFC-134A (Ex. 45 & 46). More significantly, the trend is consistent at high isoprene feed ratio (5.6 mol %), where HFO-1234yf and HFC-134A resulted in an average isoprenoid content of 6% (Ex. 51 & 52) and 8% (Ex. 47 & 48), respectively, as compared to 12% (Ex. 43 & 44) for MeCl. Similar to reactions performed at standard isoprene levels, the high isoprene butyl rubber produced in HFO-1234yf contained significantly lower isoprenoid content compared to polymerizations performed in HFC-134A.

Polymerizations were also performed in blends of fluorinated solvent with MeCl as diluent. A series of polymerizations was performed using various blend ratios of HFO-1234yf with MeCl under standard conditions at −95° C., resulting in butyl with decreased isoprenoid content at all blend ratios as compared to 100% MeCl. Table 10 lists the results of polymerizations conducted in various blend ratios of HFO-1234yf with MeCl at −95° C.

TABLE 10

| Ex. | Diluent Blend | Vol (%) | Conversion (Wt. %) | Mw ×10$^3$ | Mw/Mn | Total Unsats[1] (mol %) | Isoprenoid Content[2] (%) |
|---|---|---|---|---|---|---|---|
| 1 | MeCl | 100 | 86 | 538 | 5.2 | 1.78 | 15 |
| 2 | MeCl | 100 | 94 | 595 | 5 | 1.75 | 14 |
| 53 | MeCl/HFO-1234yf | 75/25 | 84 | 745 | 2.99 | 1.66 | 9 |
| 54 | MeCl/HFO-1234yf | 75/25 | 84 | 694 | 3.10 | 1.79 | 10 |
| 55 | MeCl/HFO-1234yf | 50/50 | 86 | 673 | 2.67 | 1.67 | 8 |
| 56 | MeCl/HFO-1234yf | 50/50 | 82 | 691 | 2.75 | 1.67 | 8 |
| 57 | MeCl/HFO-1234yf | 25/75 | 81 | 502 | 2.63 | 2.29 | 7 |
| 58 | MeCl/HFO-1234yf | 25/75 | 73 | 527 | 2.54 | 2.30 | 6 |
| 59 | HFO-1234yf | 100 | 77 | 502 | 2.45 | 2.61 | 4 |
| 60 | HFO-1234yf | 100 | 74 | 512 | 2.43 | 2.61 | 4 |

[1]Total unsaturations = 1,4-isoprene (mol %) + isoprenoid (mol %).
[2]Isoprenoid Content = Isoprenoid (mol %)/Total Unsats (mol %).

As seen in Table 10, significantly lower isoprenoid content is obtained in all blend ratios of MeCl with HFO-1234yf as compared to 100% MeCl.

Additionally, a polymerization series was performed using 50/50 blends of MeCl with HFO-1234yf as diluent at temperatures ranging from −75° C. to −95° C. The isoprene content of the feed was 2.3 mol %. Table 11 lists the results of polymerizations conducted in 50/50 ratio blends of MeCl with HFO-1234yf at temperatures ranging from −75° C. to −95° C. As seen in Table 11, across a range of temperatures the polymerizations performed in 50/50 blends of HFO-1234yf with MeCl produced butyl with lower isoprenoid content due to short chain branching from polymer back-biting reactions.

TABLE 11

| Ex. | MeCl/Diluent Blend | Reaction Temp (° C.) | Conversion (Wt. %) | Mw ×10³ | Mw/Mn | Total Unsats[1] (mol %) | Isoprenoid Content[2] (%) |
|---|---|---|---|---|---|---|---|
| 61 | HFO-1234yf | −75 | 82 | 254 | 2.91 | 1.48 | 18 |
| 62 | HFO-1234yf | −75 | 85 | 265 | 2.99 | 1.45 | 17 |
| 63 | HFO-1234yf | −80 | 82 | 229 | 3.07 | 1.47 | 20 |
| 64 | HFO-1234yf | −80 | 77 | 222 | 3.03 | 1.53 | 20 |
| 65 | HFO-1234yf | −85 | 74 | 305 | 3.06 | 1.58 | 15 |
| 66 | HFO-1234yf | −85 | 73 | 300 | 2.89 | 1.65 | 15 |
| 67 | HFO-1234yf | −90 | 69 | 354 | 3.01 | 1.50 | 12 |
| 68 | HFO-1234yf | −90 | 77 | 348 | 2.94 | 1.60 | 13 |
| 69 | HFO-1234yf | −95 | 48 | 285 | 3.08 | 1.57 | 11 |
| 70 | HFO-1234yf | −95 | 47 | 300 | 2.90 | 1.51 | 11 |

[1] Total unsaturations = 1,4-isoprene (mol %) + isoprenoid (mol %).
[2] Isoprenoid Content = Isoprenoid (mol %)/Total Unsats (mol %).

When comparing polymerizations at −95° C., the blend of HFO-1234yf with MeCl produced butyl containing the lowest content of isoprenoid (Ex. 69 & 70, Average=11%) as compared to polymerizations in pure MeCl diluent (see Table 8: Average=15%). The polymerizations performed in blends of MeCl with HFO-1234yf also produced butyl with lower isoprenoid content at −75° C. (Ex. 61 & 62, Average=18%). The butyl material produced with the blends of HFO-1234yf resulted in decreased isoprenoid content as compared to 100% MeCl at all temperatures.

Example G

Increased Isoprene Content in Butyl Rubber

Series of polymerizations were also performed in 50/50 blends of MeCl with HFO-1234ze or HFO-1234yf under standard reaction conditions at temperatures ranging from −75° C. to −95° C. Table 12 lists the results of polymerizations conducted in mixtures of the fluorinated diluents with MeCl at various temperatures ranging from −75° C. to −95° C.

As seen in Table 12, data for mixed diluent systems of fluorinated solvents with MeCl follows similar trends to the data presented in Tables 1 and 2 for the pure diluent polymerizations. At similar concentration of isoprene in the reaction feed, the MeCl/HFO-1234yf blend produced polymer with higher total isoprene incorporation than polymerizations performed with blends of MeCl with HFO-1234ze at all temperatures lower than −75° C. Polymerizations performed in blends of MeCl with HFO-1234yf resulted in the highest level of polymer unsaturation at all temperatures, similar to the results observed in the pure diluents.

The incorporation of isoprene was compared based on the ratio of feed monomer composition (f=[$M_1$]/[$M_2$]) to copolymer composition (F=[$M_1$]/[$M_2$]). It is well known in the literature that the rate constants for the copolymerization of 2 monomers can be described in Quirk R P, Gomochak-Pickel D L.; *The Science and Technology of Rubber*, 3rd Ed., Chap. 2.

$$M_1^* + M_1 \rightarrow M_1^* \quad (\text{rate}=k_{11})$$

$$M_1^* + M_2 \rightarrow M_2^* \quad (\text{rate}=k_{12})$$

$$M_2^* + M_2 \rightarrow M_2^* \quad (\text{rate}=k_{22})$$

$$M_2^* + M_1 \rightarrow M_1^* \quad (\text{rate}=k_{21})$$

The monomer reactivity ratios are derived from the rate constants as follows, and express the relative reactivity of each of the two types of growing chain ends with their 'own' monomer type as compared with the 'other' monomer:

$$r_1 = k_{11}/k_{12};\ r_2 = k_{22}/k_{12}$$

The instantaneous composition of the copolymer relative to the feed monomer concentrations can be determined using the following Mayo-Lewis equation:

TABLE 12

| Ex. | MeCl/Diluent Blend | Vol (%) | Reaction Temp (° C.) | Isoprene Content in Feed (mol %) | Conversion (Wt. %) | Mw ×10³ | Mw/Mn | Total Unsats[1] (mol %) |
|---|---|---|---|---|---|---|---|---|
| 71 | HFO-1234ze | 50/50 | −75 | 2.3 | 25 | 145 | 4.18 | 1.20 |
| 72 | HFO-1234ze | 50/50 | −75 | 2.3 | 12 | 106 | 1.83 | 1.08 |
| 73 | HFO-1234ze | 50/50 | −80 | 2.3 | 19 | 94 | 5.65 | 1.22 |
| 74 | HFO-1234ze | 50/50 | −80 | 2.3 | 21 | 108 | 5.69 | 1.19 |
| 75 | HFO-1234ze | 50/50 | −85 | 2.3 | 24 | 136 | 5.71 | 1.30 |
| 76 | HFO-1234ze | 50/50 | −85 | 2.3 | 27 | 120 | 5.30 | 1.57 |
| 77 | HFO-1234ze | 50/50 | −90 | 2.3 | 31 | 165 | 4.02 | 1.51 |
| 78 | HFO-1234ze | 50/50 | −90 | 2.3 | 29 | 135 | 5.17 | 1.63 |
| 79 | HFO-1234ze | 50/50 | −95 | 2.3 | 33 | 243 | 4.18 | 1.39 |
| 80 | HFO-1234ze | 50/50 | −95 | 2.3 | 42 | 238 | 4.13 | 1.46 |
| 81 | HFO-1234yf | 50/50 | −75 | 2.3 | 88 | 310 | 4.89 | 1.45 |
| 82 | HFO-1234yf | 50/50 | −75 | 2.3 | 89 | 275 | 5.18 | 1.42 |
| 83 | HFO-1234yf | 50/50 | −80 | 2.3 | 82 | 229 | 3.07 | 1.47 |
| 84 | HFO-1234yf | 50/50 | −80 | 2.3 | 77 | 222 | 3.03 | 1.53 |
| 85 | HFO-1234yf | 50/50 | −85 | 2.3 | 74 | 305 | 3.06 | 1.58 |
| 86 | HFO-1234yf | 50/50 | −85 | 2.3 | 73 | 300 | 2.89 | 1.65 |
| 87 | HFO-1234yf | 50/50 | −90 | 2.3 | 69 | 354 | 3.01 | 1.50 |
| 88 | HFO-1234yf | 50/50 | −90 | 2.3 | 77 | 348 | 2.94 | 1.60 |
| 89 | HFO-1234yf | 50/50 | −95 | 2.3 | 75 | 458 | 4.61 | 1.74 |
| 90 | HFO-1234yf | 50/50 | −95 | 2.3 | 62 | 455 | 5.02 | 1.62 |

[1] Total unsaturations = 1,4-isoprene (mol %) + isoprenoid (mol %).

$$\frac{d[M_1]}{d[M_2]} = \frac{[M_1](r_1[M_1]+[M_2])}{[M_2](r_2[M_2]+[M_1])}$$

where:

$f=[M_1]/[M_2]$ (monomer feed ratio)

$F=d[M_1]/d[M_2]$ (copolymer composition)

In the case where $r_1 \gg 1 \gg r_2$ a drift in the composition of the polymer formed throughout the reaction will occur, with monomer 1 being preferentially added early in the reaction. The second monomer will react more during the later stages of the polymerization once monomer 1 is mostly consumed. Indeed, it is well known that the reactivity ratios for an isobutylene/isoprene copolymerization in MeCl is $r_1=2.5$ and $r_2=0.4$, resulting in an f/F ratio close to 0.6. To achieve a more random copolymer the reactivity ratios should be equal and close to 1. ($r_1=r_2=1$) In this limiting case, the f-ratio (f/F) will be closer to 1.0.

Figure 5:
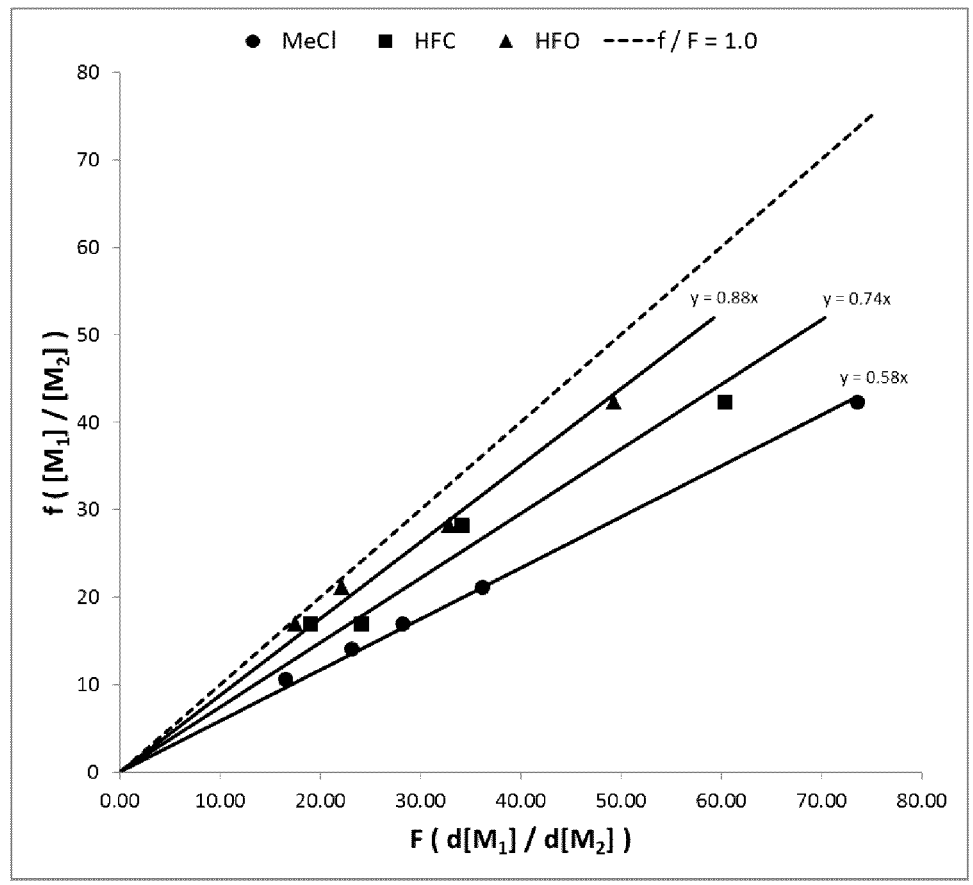
FIG. 5 depicts a graph showing feed monomer ratio (f) as compared to copolymer ratio (F) for polymerizations performed in MeCl, HFC-134A and HFO-1234yf at various feed isoprene levels.

Table 13 lists the results of polymerizations conducted in pure diluents at –95° C. with feed isoprene contents in the range from 2.3 to 8.6 mol %. Similar to the examples in Table 12, rubber produced at –95° C. using HFO-1234yf as diluent contains significantly more unsaturation from incorporated isoprene than compared to the other diluent systems at all feed isoprene contents. FIG. 5 compares the feed and copolymer monomer ratios (f-ratio) for the polymerizations in pure diluents at –95° C. It is observed that the fit line through the data gives an f-ratio of 0.88 for the butyl copolymer produced in HFO-1234yf. In comparison the f-ratio fit line for HFC-134A is 0.74 and for MeCl is 0.58. Therefore, it is clear that the reactivity ratios in HFO-1234yf are more closely matched resulting in an increased incorporation of isoprene during the polymerization and thus a more random copolymer. HFO-1234yf results in an increased incorporation of isoprene (f/F=0.9) as compared to HFC-134A (f/F=0.8) or MeCl (f/F=0.6).

TABLE 13

| Ex. | Diluent | Feed Isoprene Content (mol %) | f ([M$_1$]/[M$_2$]) | Conversion (Wt. %) | Total Unsats[1] (mol %) | F ([M$_1$]/[M$_2$]) | f/F |
|---|---|---|---|---|---|---|---|
| 91 | CH$_3$Cl | 2.3 | 42.3 | 80 | 1.34 | 73.6 | 0.57 |
| 92 | CH$_3$Cl | 4.5 | 21.2 | 38 | 2.69 | 36.17 | 0.58 |
| 93 | CH$_3$Cl | 5.6 | 16.9 | 71 | 3.42 | 28.24 | 0.60 |
| 94 | CH$_3$Cl | 6.6 | 14.1 | 40 | 4.14 | 23.15 | 0.61 |
| 95 | CH$_3$Cl | 8.6 | 10.6 | 72 | 5.71 | 16.51 | 0.64 |
| 96 | HFC-134A | 2.3 | 42.3 | 58 | 1.63 | 60.4 | 0.70 |
| 97 | HFC-134A | 3.4 | 28.2 | 51 | 2.85 | 34.1 | 0.83 |
| 98 | HFC-134A | 4.5 | 21.2 | 48 | 3.98 | 24.1 | 0.88 |
| 99 | HFC-134A | 5.6 | 16.9 | 54 | 5.00 | 19.0 | 0.89 |
| 100 | HFO-1234yf | 2.3 | 42.3 | 87 | 1.99 | 49.2 | 0.86 |
| 101 | HFO-1234yf | 3.4 | 28.2 | 22 | 2.95 | 32.9 | 0.86 |
| 102 | HFO-1234yf | 4.5 | 21.2 | 43 | 4.32 | 22.2 | 0.96 |
| 103 | HFO-1234yf | 5.6 | 16.9 | 47 | 5.40 | 17.5 | 0.97 |

[1] Total unsaturations = 1,4-isoprene (mol %) + isoprenoid (mol %).

The novel features of the present invention will become apparent to those of skill in the art upon examination of the detailed description of the invention. It should be understood, however, that the scope of the claims should not be limited by the preferred embodiments set forth in the examples, but should be given the broadest interpretation consistent with the specification as a whole.

What is claimed is:

1. A copolymer composition comprising a copolymer of at least one isoolefin monomer and at least one multiolefin monomer in mixture with at least one cyclic oligomer, wherein the copolymer composition is in a slurry,
   the copolymer composition produced by polymerizing the at least one isoolefin monomer with the at least one multiolefin in a slurry process at a temperature of less than or equal to –95° C. in a diluent comprising 2,3,3,3-tetrafluoro-1-propene (HFO-1234yf),
   the copolymer composition has a cyclic oligomer content of less than or equal to 2000 ppm and at least 10% lower than a cyclic oligomer content of a polymer composition produced from the same isoolefin monomer and the same multiolefin monomer, made with the same amounts and molar ratios of isoolefin and multiolefin monomers, in the same slurry process except using 1,1,1,2-tetrafluoroethane as a diluent,
   wherein the at least one cyclic oligomer has a $C_{13}$ cyclic oligomer content and a $C_{21}$ cyclic oligomer content, and a ratio of the $C_{21}$ cyclic oligomer content to the $C_{13}$ cyclic oligomer content is less than or equal to 1.5.

2. A copolymer composition comprising a copolymer of at least one isoolefin monomer and at least one multiolefin monomer in mixture with at least one cyclic oligomer, wherein the copolymer composition is in a slurry,
   the copolymer composition produced by polymerizing the at least one isoolefin monomer with the at least one multiolefin in a slurry process at a temperature of less than or equal to –95° C. in a diluent comprising 2,3,3,3-tetrafluoro-1-propene (HFO-1234yf),
   the copolymer composition has a total cyclic oligomer content of less than 1000 ppm, wherein the cyclic oligomers include $C_{13}$ cyclic oligomers and $C_{21}$ cyclic oligomers, wherein a ratio of the $C_{21}$ cyclic oligomers to the $C_{13}$ cyclic oligomers is less than 1.5.

3. A purified copolymer composition prepared by stripping the copolymer composition according to claim 2,
   wherein the purified copolymer composition has a total cyclic oligomer content of less than or equal to 600 ppm following the stripping.

4. The copolymer composition according to claim 2, wherein the at least one isoolefin monomer comprises an isoolefin having from 4 to 16 carbon atoms and the at least one multiolefin comprises a conjugated diene having from 4-14 carbon atoms.

5. The copolymer composition according to claim 4, wherein:

the at least one isoolefin monomer is selected from the group consisting of isobutene, 2-methyl-1-butene, 3-methyl-1-butene, 2-methyl-2-butene, 4-methyl-1-pentene, and mixtures thereof, and the at least one multiolefin monomer is selected from the group consisting of isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof.

6. The copolymer composition according to claim 5, wherein:

the at least one isoolefin monomer comprises isobutene; and the at least one multiolefin monomer comprises isoprene.

7. The copolymer composition according to claim 6, wherein the process further comprises contacting at least one additional monomer with the at least one isoolefin monomer and the at least one multiolefin.

8. The copolymer composition according to claim 1, wherein:

the copolymer composition has a cyclic oligomer content at least 75% lower than a cyclic oligomer content of a polymer composition produced from the same isoolefin monomer and the same multiolefin monomer in the same slurry process except using 1,1,1,2-tetrafluoroethane as a diluent;

the at least one isoolefin monomer is selected from the group consisting of isobutene, 2-methyl-1-butene, 3-methyl-1-butene, 2-methyl-2-butene, 4-methyl-1-pentene, and mixtures thereof; and the at least one multiolefin monomer is selected from the group consisting of isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene, and mixtures thereof.

9. The copolymer composition according to claim 2, wherein:

the total cyclic oligomer content is less than or equal to 650 ppm;

the at least one isoolefin monomer is selected from the group consisting of isobutene, 2-methyl-1-butene, 3-methyl-1-butene, 2-methyl-2-butene, 4-methyl-1-pentene, and mixtures thereof; and the at least one multiolefin monomer comprises one or more compounds selected form the group consisting of isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene, and mixtures thereof.

* * * * *